(12) United States Patent
Mizwicki et al.

(10) Patent No.: US 8,697,185 B2
(45) Date of Patent: Apr. 15, 2014

(54) RAPID ACTION COATER AND PROCESS FOR COATING CERAMIC PARTICLES USING SAME

(75) Inventors: Robert H. Mizwicki, Naperville, IL (US); Kelley J. Kerns, St. Joseph, MI (US)

(73) Assignee: Fairmount Minerals, Ltd., Chardon, OH (US)

( * ) Notice: Subject to any disclaimer, the term of this patent is extended or adjusted under 35 U.S.C. 154(b) by 136 days.

(21) Appl. No.: 12/914,560

(22) Filed: Oct. 28, 2010

(65) Prior Publication Data

US 2011/0104371 A1    May 5, 2011

Related U.S. Application Data

(63) Continuation of application No. 11/630,966, filed as application No. PCT/US2005/029008 on Aug. 15, 2005, now abandoned.

(60) Provisional application No. 60/602,035, filed on Aug. 17, 2004.

(51) Int. Cl.
  *B05D 7/26* (2006.01)
  *B01F 5/26* (2006.01)

(52) U.S. Cl.
  USPC ........... 427/212; 427/214; 427/215; 427/221; 366/133

(58) Field of Classification Search
  USPC .......... 427/213.31, 213.32, 213.33, 214, 215, 427/220, 212, 221; 366/133
  See application file for complete search history.

(56) References Cited

U.S. PATENT DOCUMENTS

| | | | |
|---|---|---|---|
| 1,948,805 A * | 2/1934 | Simpson | 366/153.3 |
| 3,101,040 A | 8/1963 | Lantz | |
| 3,191,912 A | 6/1965 | Frye | |
| 3,967,005 A | 6/1976 | Cattaneo | |
| 4,090,995 A | 5/1978 | Smillie | |
| 4,238,523 A | 12/1980 | Porter | |
| 4,439,489 A | 3/1984 | Johnson et al. | |
| 4,494,318 A | 1/1985 | Smillie | |
| 4,987,850 A * | 1/1991 | McCracken | 118/303 |
| 5,211,985 A | 5/1993 | Shirley, Jr. et al. | |
| 5,401,534 A | 3/1995 | Bourreau et al. | |
| 5,811,038 A | 9/1998 | Mitchell | |

(Continued)

OTHER PUBLICATIONS

Office Action from U.S. Appl. No. 11/630,966 dated Dec. 14, 2009.

(Continued)

*Primary Examiner* — Elena T Lightfoot
(74) *Attorney, Agent, or Firm* — Calfee, Halter & Griswold, LLP

(57) ABSTRACT

A new device and process for continuously applying coatings, such as resin and additives or polymers or the like, to minerals are disclosed. The device and apparatus differ substantially from standard batch coating processes currently used by industry. The apparatus uses a horizontal cylinder with an internal auger and a series of injection ports distributed along the cylinder. Minerals that are to be coated are pretreated and passed through the mixing cylinder using the auger (which may comprise one or more screws with variable pitch blades). As the mineral particles pass through the cylinder various coating materials are injected by the injection ports. The complete system is described, the method of use is explained and the control system which allows for different products is described.

19 Claims, 10 Drawing Sheets

(56) References Cited

U.S. PATENT DOCUMENTS 6,328,798 B1    12/2001    Bostrom et al.
6,536,939 B1    3/2003    Blue
6,962,200 B2    11/2005    Nguyen et al.

OTHER PUBLICATIONS

Response (Second Preliminary Amendment) to Dec. 14, 2009 Office Action from U.S. Appl. No. 11/630,966 dated Jan. 11, 2010.
Office Action from U.S. Appl. No. 11/630,966 dated Feb 8, 2010.
Response to Feb. 8, 2010 Office Action from U.S. Appl. No. 11/630,966 dated Feb. 23, 2010.
Office Action from U.S. Appl. No. 11/630,966 dated Apr. 28, 2010.
International Search Report from International Application No. PCT/US05/29008 date of mailing Jan. 4, 2006.
International Preliminary Report on Patentability from International Application No. PCT/US2005/029008, date of issuance Feb. 20, 2007.
International Preliminary Report on Patentability from International Application No. PCT/US05/29008, date of completion Jun. 11, 2007.
Supplementary European Search Report from EP Application No. EP 05 78 6569, date of completion Feb. 18, 2011; 6 pages.
Office Action from Canadian Patent Application No. 2,575,665 dated Jan. 27, 2011, 2 pages.
First substantive examination report from European Patent Application No. 05786569.3 dated Jun. 14, 2013.

\* cited by examiner

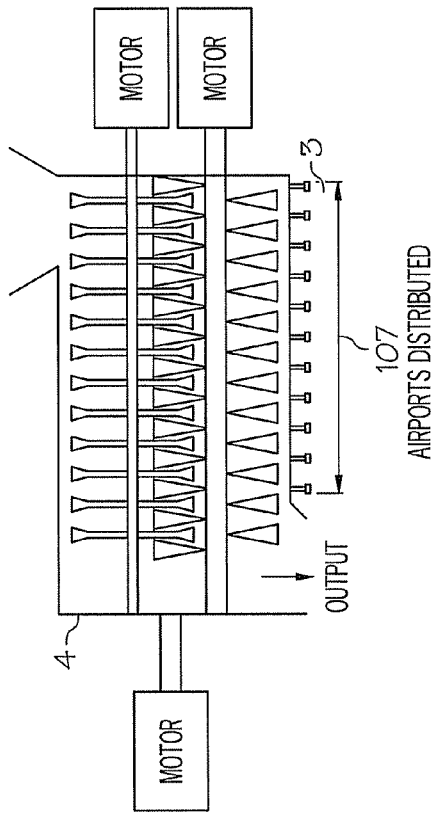
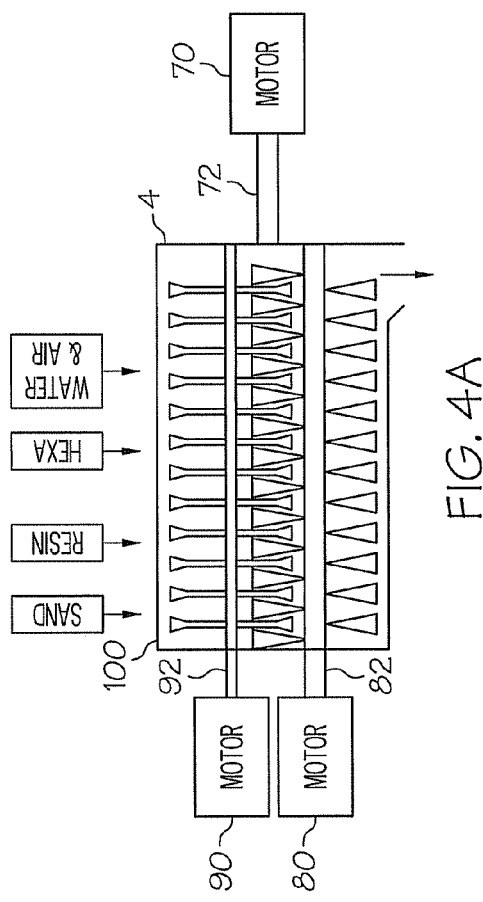
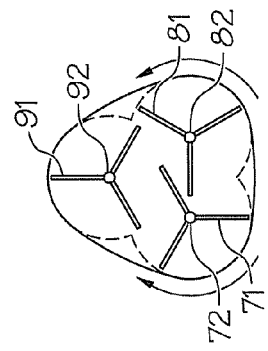

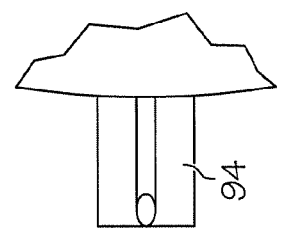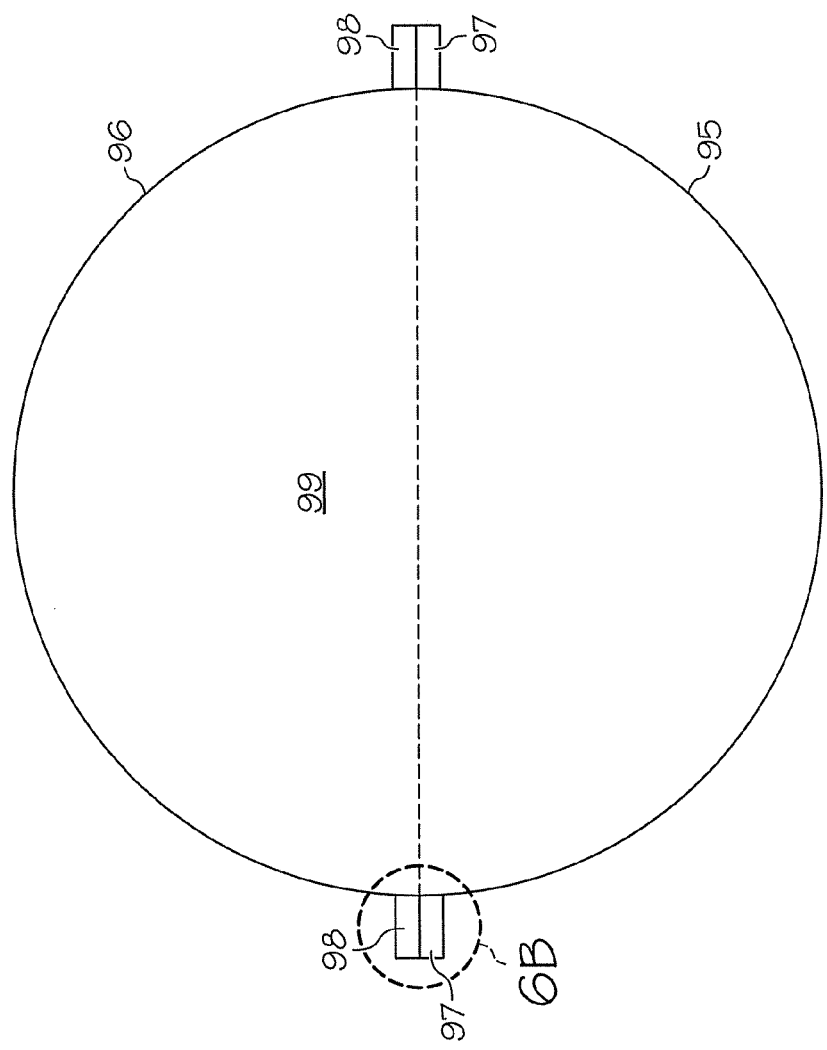

RAPID ACTION COATER AND PROCESS FOR COATING CERAMIC PARTICLES USING SAME

This application is a continuation of U.S. patent application Ser. No. 11/630,966 with a filing date of 27 Dec. 2006, which claims priority to a national stage filing under 35 U.S.C. 271 of International Application Number PCT/US2005/029008 with an international filing date of 15 Aug. 2005, which claims priority to U.S. Ser. No. 60/602,035, filed 17 Aug. 2004.

TECHNICAL FIELD OF THE INVENTION

The present invention relates generally to an improved process for coating sand, ceramic and other substrates with novalac resins and other coatings. More particularly it relates to an apparatus and method for a continuous rapid coating process as opposed to current processes that use batch coating.

BACKGROUND OF THE INVENTION

The prior art will be described in terms of resin coated sand used in the Shell Process employed by the metal casting and foundry industry. The shell process was developed in Germany during the Second World War, and the process was used to produce molds for mortars, artillery shells and other projectiles. The Germans attempted to keep the process secret after the war; however, the process was discovered by allied investigators who placed the process in the public domain as war booty which then provided the foundry industry with a revolutionary process.

The Shell Process (also known as the Croning or C Process) is used to produce hollow light weight molds and cores for pipe hubs, cores, crank shafts, intake manifolds for engines, etc. In fact, more foundries utilize the shell process, to produce resin sand cores and molds, than any other process. The process is extensively applied worldwide.

The original process blended raw sand with powdered phenolic resin and powdered hexamethylenetetramine (a curing agent) which was gravity fed into a preheated pattern. The heat melted the resin and hardener to fuse the sand. After a suitable thickness of sand was obtained, the unactivated sand was dumped from the pattern, leaving the hollow core sand mold. As time went by, the process was improved by pre-coating the sand with the required ingredients (resin-hardener-wax-fillers-etc.) at a sand facility. The "foundry sand" is then sold as a free-flowing product to foundries (or foundries produce their free-flowing product).

The current state of the art uses batch mixers to coat substrates (minerals, ceramics, etc.) with a resin(s) and other ingredients. That is, sand is preweighed, heated to the desired temperature and transferred into a batch mixer. Resin(s) and additives are then added sequentially and held in the mixer until the material has reached the required cure stage or begins to break down into smaller agglomerated clumps of sand and resin. The mixture is then dumped and the cycle is repeated.

U.S. Pat. No. 4,439,489 to Johnson et al. discusses several processes for coating proppants (a substrate used in the oil industry) all of which use a batch process. U.S. Pat. No. 4,090,995 to Smillie describes another batch process used to coat sand for use in shell molds. It is interesting to note that the resin acts in proppants and shell sands in a similar manner—that is the resin acts to hold the substrate in a fixed shape, or to strengthen the substrate. Thus, the techniques used to coat proppants or industrial sand is similar.

It is well known that batch processes are time consuming. For example, the assignee currently uses 1000-1200 pound [455-546 kg] pug mixer with included mixer paddles at its Bridgman, Mich. plant. (See FIG. 1) The typical batch mixer cycle is 3-5 minutes depending on product formulation. Approximately 15 seconds of non-productive time is experienced as each batch is discharged, and a new sand charge is added to the mixer. Thus, the mixer can only produce 1200 pounds [546 kg] times every 3-5 minutes or around 144,000 pounds [65,455 kg] per shift. It is believed that if the process is modified to be a continuous mixer process, the mixer would be capable of operating at significantly higher production rates.

There are other problems with the batch process explained above. Heated sand is dropped in the batch mixer, and the required resins and other ingredients are added to the mixer with the paddle stirring the mix. Minutes into the mixing process, hexamethylenetetramine (hexa—the curing agent or hardener) solution is added along with water and wax. At this stage the mix agglomerates (goes from a free mixing sand to a material that looks like stiff bread dough), thus reducing the probability of an even coat of the particles. The mixing process continues thereby breaking up most of the agglomerated mixture. The portion of the mixture that does not break up is sent to a roll crusher (or similar device) that breaks up chunks of particle mix eventually producing a free flowing product. It should be remembered that the foregoing example is for a 1200 pound [546 kg] batch type mixer. Various sizes of batch type mixers will yield different production rates.

There are several manipulative stages involved following the batch mix process used to create a free flowing product, and these stages require considerable transfer of the material through various material handling systems and various physical levels within the process plant thereby expending considerable energy. The process described above is for a single coating and often (particularly for "frac-sand") the substrate is coated a second and even a third time.

The concept behind a resin coated substrate is to obtain a uniform coating on each particle. In order to coat a particle, the substrate is heated to obtain a surface temperature hot enough to melt the resin while not heat soaking the particle. The curing agent is then brought into contact with the heated particle. If the particle remains hot, then the resin will cure (referred to as the "C-stage"); however, if the particle is quenched, then the resin will only partially cure (referred to as the "B-stage"). Thus, in the coating process the use of solution curing agents (hexa in solution) is paramount. The water in the solution removes the heat from the particle. Some resins require a higher melting temperature, thus, more heat must be removed and additional water is added after adding the curing agent. In some cases additional cooling is required and air or a cooling water jacket is be used.

Thus, there remains a need to convert batch resin coating processes to continuous processes thereby increasing productivity and reducing energy use while maintaining or even improving product quality.

SUMMARY OF THE INVENTION

The actual invention consists of an extended cylindrical conduit, that may take a trough-like shape (a cylinder with lobes), and that may be divided into one or more segments thereby forming the continuous mixer. The simplest embodiment of the continuous mixer, employed in a rapid action coater, is a single segment. Further the simplest continuous mixer has a lateral set mixing paddles extending through the center of the cylindrical conduit, attached to a paddle (or blade) support rod and driven by an external drive. The mixing paddles (blades) are separated longitudinally along the paddle support rod and are angled to the rod such that as the rod is rotated the paddles tend to mix and move the sand laterally through the mixer. Thus, the rotating mixer paddles serve to mix and transport the material.

The paddles may have adjustable pitch, and the drive motor may be variable speed. The pitch and speed of the mixer paddles will be set by the residence time required to coat the particles, add curing agents, add waxes and other ingredients and quench (stop the curing at the B-stage) or drive the mix to full cure (C-stage). In certain cases the continuous mixer may be used to coat particles with polymer coats which do not require the use of curing agents and other ingredients.

In the rapid action coater system, a continuous sand heater charges the continuous mixer. As the heated sand enters the mixer section, molten resin and/or solid resin is added. The sand and resin are mixed and travel down the mixer. At the proper point—set by the velocity of the sand/resin mix or by the reactionary stage—further additives are injected from holding tanks, silos or containers. Similarly at the proper point—also set by the velocity of the sand/resin/additive mix (or reaction stage)—the required solution mix (hexa and water) is added. Further additives may further be injected. The mixture continues down the mixer where air from an ancillary drier system dries the mixture. The mixture then passes from the mixer and through a shaker screen. The product is then passed through a final screen and sent to storage.

BRIEF DESCRIPTION OF THE DRAWINGS

FIG. 4 shows a triple paddle support rod system utilizing two segments. Note the tough-like or nodal shape.

FIG. 6 shows a conceptual continuous mixer that splits in two for ease of maintenance.

DETAILED DESCRIPTION OF THE EMBODIMENT

Figure 5A:
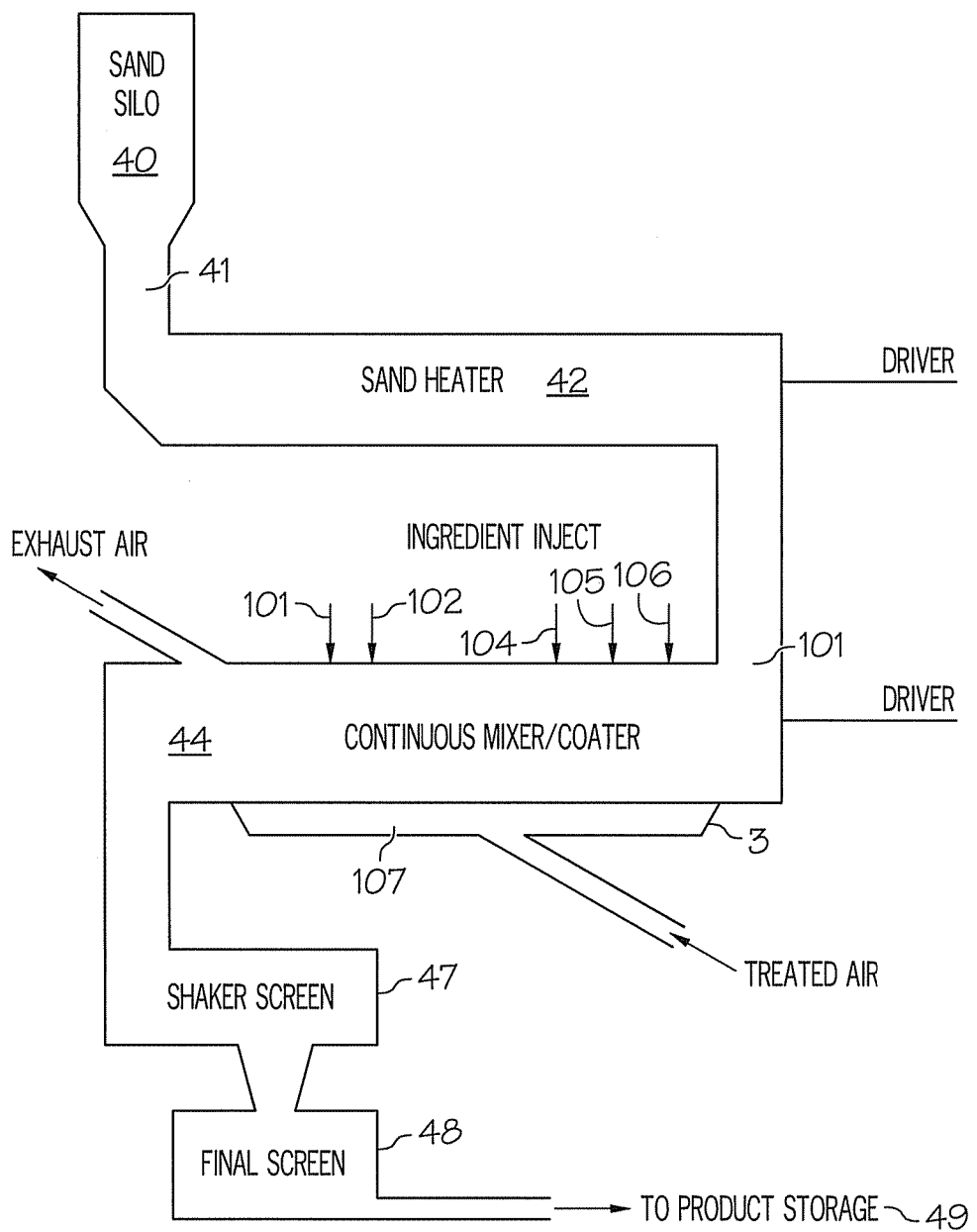
FIG. 5A shows one embodiment of the rapid action coater system detailing the ancillary units employing a single segment continuous mixer.
Figure 5B:
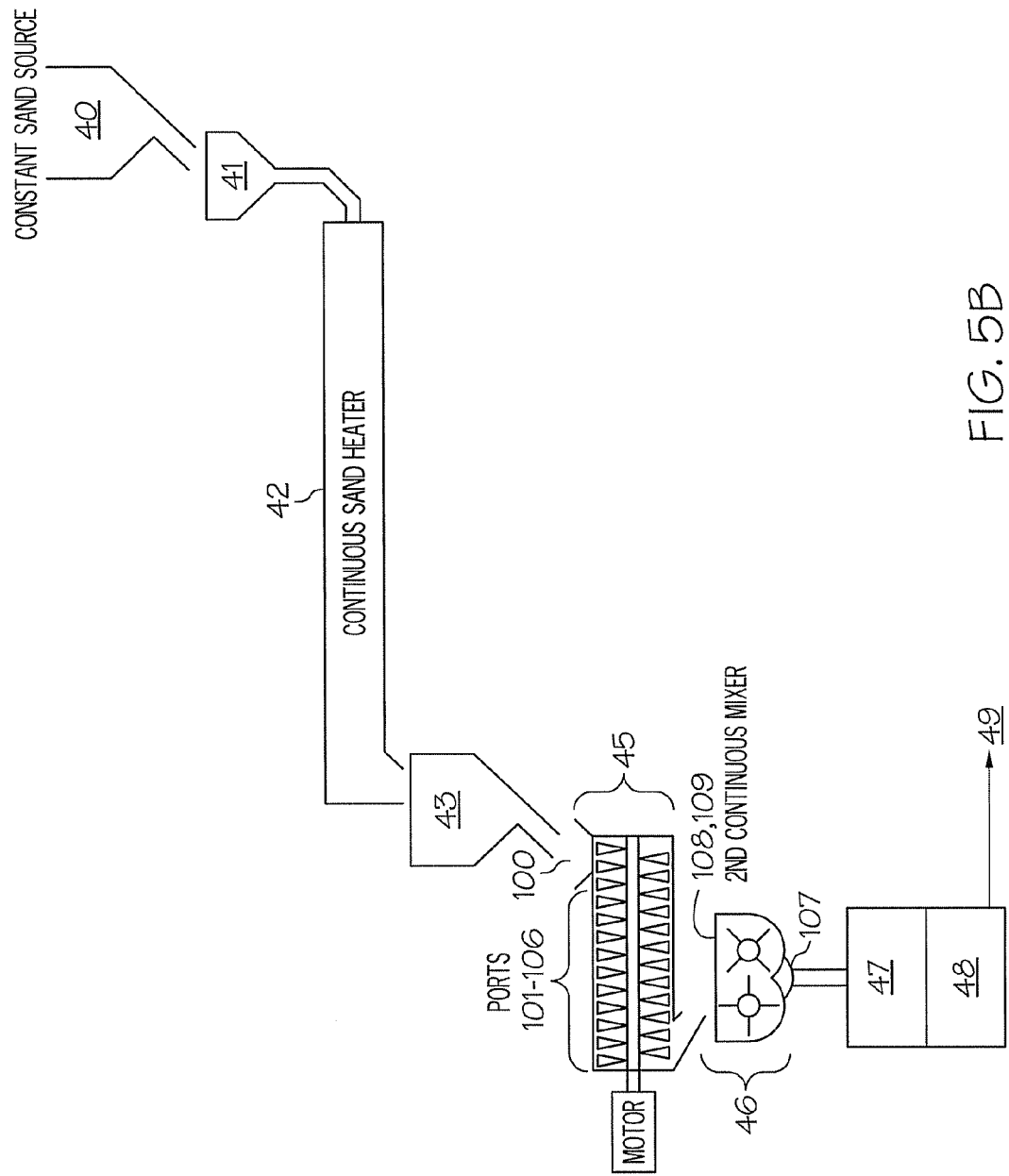
FIG. 5B shows another embodiment of the rapid action coater system detailing the ancillary units employing a multiple segment continuous mixer. Note the trough-like shape of the continuous mixer shown in the figure.

Referring to FIGS. 5A and 5B, the instant invention is conceptually shown as the rapid action coating system with its required ancillary units. Overall there are five main units.

Unit One—a sand hopper and associated flow control unit (note—more than one hopper and associated flow control unit may be used depending on circumstances and required product). {Item 40, 41}

Unit Two—a continuous sand heater with associated furnace (or source of heat) and control system. {Item 42}

Unit Three—the continuous mixer: preferably having twin screws. {Item 44 or 45 and 46}

Unit Four—an external blower drier system with associated controls and dust recovery. {Not shown}

Unit Five—a shaker/final screen assembly. {Items 47 and 48}

In addition to the external blower drier system with associated controls it should be realized that the exhaust air is passed to a scrubber system in order to meet air quality control regulations.

The sand heater will contain paddles (or similar) in order to stir the sand thereby bringing the sand into contact with the heater and assuring uniform temperature through the sand. It is possible to combine the sand heater and continuous mixer as a single unit; however, for simplicity, the instant invention will be described as separate units.

Figure 1:
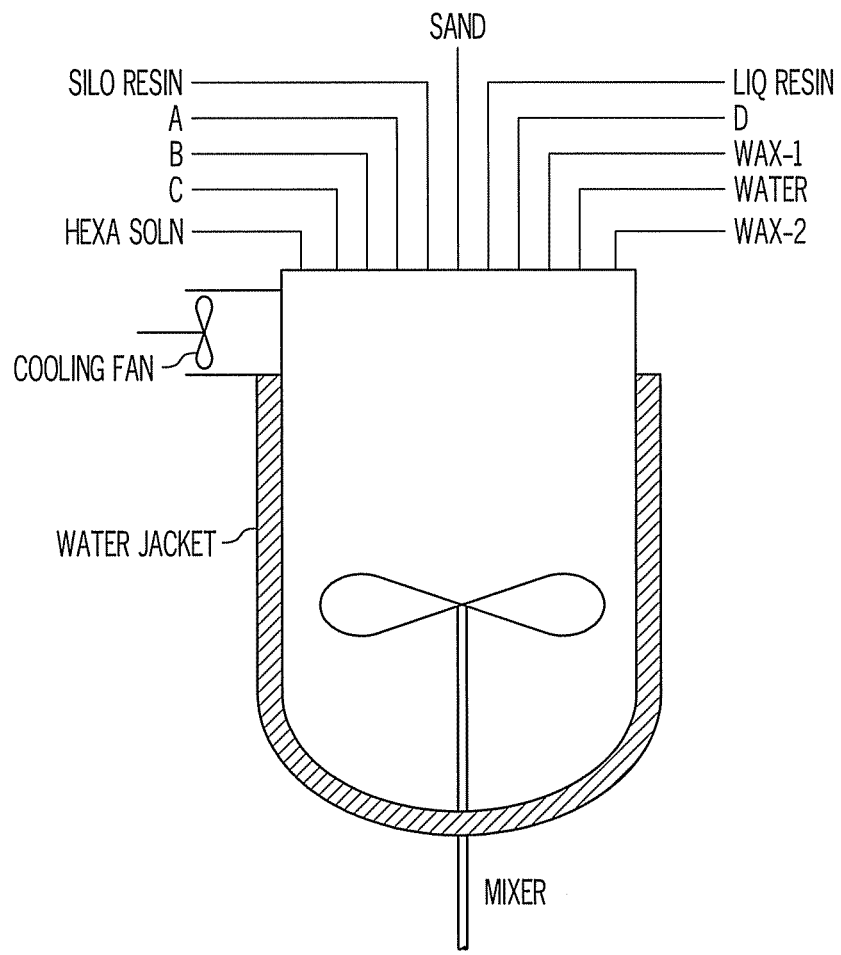
FIG. 1 shows the Prior Art Batch-type mixer
Figure 2:
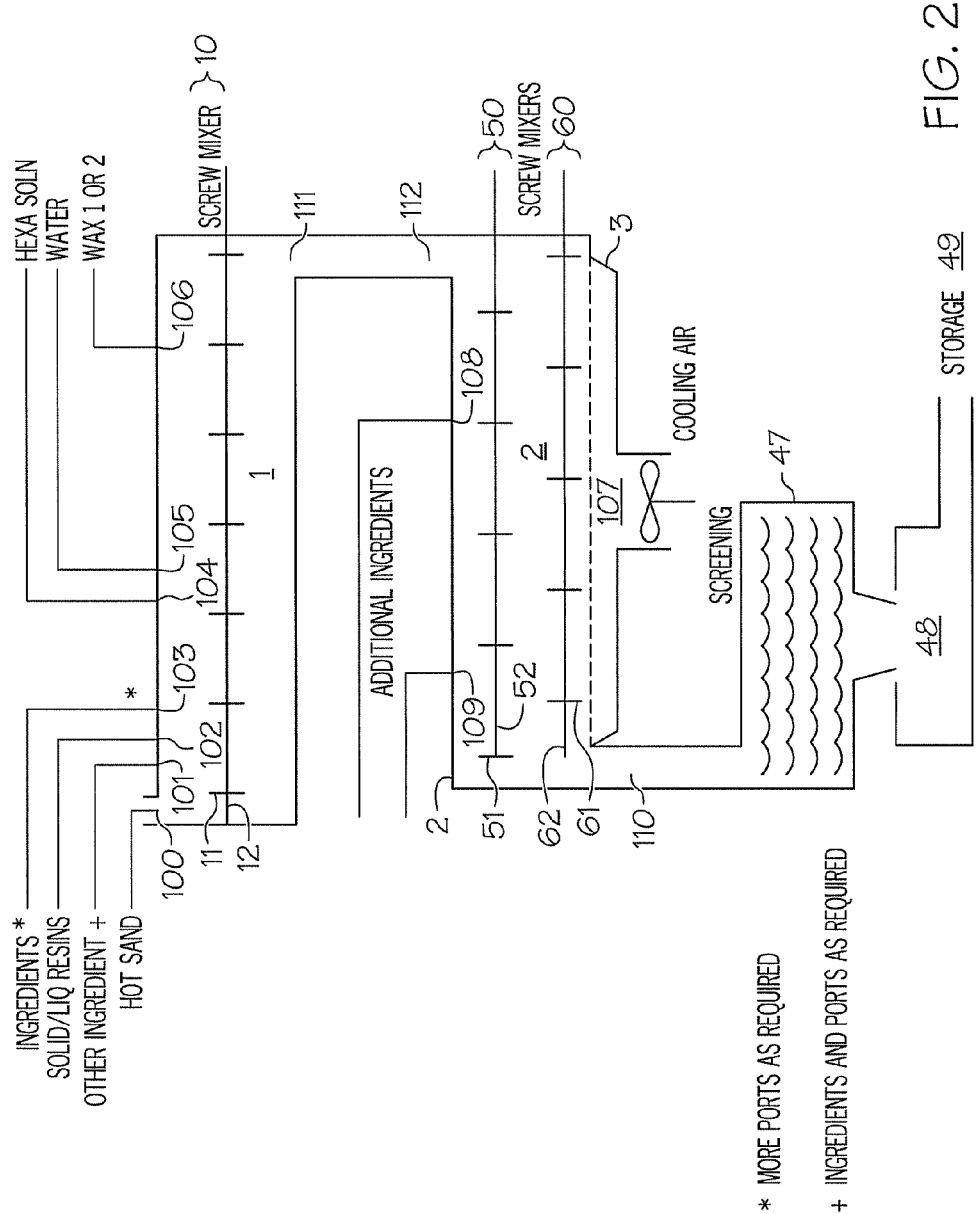
FIG. 2 shows a conceptual schematic of the Instant Invention, using two segments. The first segment uses a single mixer and the second segment uses a dual mixer.

Referring to FIG. 2, the continuous mixer is shown with a single screw mixer, 10, having a screw shaft, 12, and associated screw paddles, 11, in the first segment, 1. FIG. 2 shows the second segment, 2, with two screws, 50 and 60, screw shafts, 52 and 62, and associated screw paddles, 51 and 61. Admittedly this conceptual arrangement is strange, but it serves to illustrate two embodiments of the invention in one drawing. The first embodiment is a single screw (auger) mixer, and the second (preferred) embodiment is the dual screw (auger) mixer.

The continuous mixer receives hot sand at the input, 100, and has injection ports, 101-106, for additives—wax, clay, oxides, plasticizers and the like, and a hexa/water solution. The actual physical location of the injection ports is set by process times and the velocity of the mix traveling down the mixer. The injection ports are in communication with storage facilities—tanks or silos as the material requires. Control valves (controlled by a control system) open as set by the product requirements and coat the particles. The term coat is used to mean physically coating or bonding to the particles as well as "coating" the particles with additives as required by a particular product. In fact, the additive coating or coatings may be considered as an encapsulation of the coat that is physically bonded to the particle. Some additive coatings are applied a premix. That is the encapsulation materials are premixed and then injected into the proper port (or point) in the continuous mixer.

For example, based on the batch process described above, the typical resin charge and mull time is 70 seconds followed by additives and solutions. (It should be noted that some additives and solution may go in with the sand.) Thus, the distance from the point at which the sand and resin are brought together, to where the first injection port, 101, is located will be given by:

$$\bar{u}/t_r$$

where $\bar{u}$ is the average velocity (feet/sec) of the mix and $t_r$ is the resin mix time in seconds.

Similarly the injection point for the hexa/water mix ports, 104 and 105, may be determined as may the entrance port(s) for the drying/cooling air, 107—distributed over a portion of the mixer, 3. Supplemental injection points may be used.

As stated above, the injection ports can inject a material that bonds to a particle or inject a material that "coats" the particle or both. Thus, coating materials (or ingredients) may mean a material, such as resin, that bonds to the particle; or an additive, such as wax, that coats the bonded material. Different additives (ingredients) are used for different products. The inventors visualize a system were one or more ports are in communication with the same ingredient so that injection may occur at a different point in the mixing/coating process. The control system (FIG. 9) would chose which port is activated for a given product.

The screw mixers, 10, 50 and 60 are driven by variable speed motors and the paddle pitch may be changed (manually or automatically). Thus, the combination of paddle pitch and screw (auger) speed will set the residence time in the continuous mixer. In fact, some paddles may be adjusted to cause the mix to travel backward causing the mixture to "waver" in the continuous mixer thereby increasing the residence time.

FIG. 2 also shows how a two segment continuous mixer is conceptually joined. The input aperture, 100, is shown where prepared particles enter the first mixer, travel through the first mixer to the intermediate output aperture, 111, and travel to the intermediate input aperture, 112, and then to the output aperture, 110, both on the second mixer.

A conceptual view of the instant invention, used in the preferred rapid action coater system, is shown in FIG. 5B as a dual mixer two segment system. The reader must realize that temperatures and times in this disclosure are given for illustration only and will be set by the actual product required and/or resin being applied to the substrate. (A substrate can be a man-made ceramic or naturally occurring material such as sand.)

Referring now to FIGS. 2, 5A and 5B, sand (or substrate) is stored in a hopper and flow control system, 40 and 41, which are capable of supplying a sand heater, 42. Flow from the sand heater is set controlled by an associated sand flow control system, 41. Sand passes through the heater and is brought to a uniform specified temperature by the time the material reaches the end of the heater section. The heated sand may be retained in a flow control system, 43. The material then passes into the input, 100, of the continuous mixer where molten resin and/or solid resin is added to the material via inlet ports, 101-106. The resin and material pass through the continuous mixer. The velocity of the mix is set by the rate of material injection (from the heater), the flow of the resin, the speed (and diameter) of the screw mixer or mixers (10, 50 and 60) and the cross-section of the continuous mixer conduit. The mixture passes down the continuous mixer (in general 44 and specifically 45 and 46) where it passes (after the required time period) under the additive injection ports, 101-103, thereby absorbing the required additive.

In a similar manner, the mix then passes under the solution injection port, 104, having spent the required mixing time in the mixer before the solution is added. Water may be added at port 105 and additional ingredients may be added at port 106. The mix then passes through the drying section of the mixer, 107, past auxiliary injection ports, 108 and 109, and onto the end of the mixer where passes into the shaker screen/final screener, 47/48, and then to packaging or storage, 49. Supplemental injection ports may be added.

The drying air is maintained at the required temperature by an associated control system (not shown) and it may be heated, cooled or maintained at ambient. The exhaust air is passed to a scrubber (not shown) system thereby meeting air quality control regulations.

The design described above may be changed. For example, an optimum design would use the preferred twin screw and sequentially introduce the resin to mix on the sand (material), the additives, the hexa solution, cooling the sand while mixing to the so-called "B-stage" buildup and breakdown. Wax would then be added and the mixture discharged to the screen. A cooler/dyer may or may not be used. The addition and sequencing of additives, solutions, drying, etc. will vary on the type of material and desired resin coat. Also, a second continuous mixer may be used in sequence for the hexa solution addition and other additives and to facilitate material breakdown. The second continuous mixer may be employed to add a second coat and a third system may be supplemented to add a third coating. Rather than employ multiple segments for second and third coats, additional ports may be incorporated in the mixer to add ingredients at the proper time (point).

Design changes are almost unlimited and are up to the design team as would be set by end user requirements. For example, the first segment in the continuous mixer may be the sand heater with resin and required ingredients injected towards the end of the first segment. The second segment would continue the mixing process, add the curing agent and quench. Subsequent segments could be added to vary product qualities. In fact all segments could be combined as one very long system. It is possible to have a dual segment continuous mixing device that only applies a coating in the first segment and allows the particles to continue to mix and react in the second segment. Similarly, it is possible to have no coating in the first segment and only coat in the second segment. Thus, the continuous rapid action coater concept is very adaptable.

As stated above, FIG. 2 shows a continuous mixer divided into two segments. The first segment, 1, has a single mixer screw, 10, and associated paddles, 11, mounted to a shaft, 12. The second segment, 2, has the preferred twin screw system, 50 and 60 and associated paddles, 51 and 61, mounted to shafts 52 and 62 respectively. FIG. 5A on the other hand shows a single segment continuous mixer that may utilize a single mixer screw or a dual mixer screw used in the rapid action coater system. Thus, the continuous mixer may consist of one or more segments and have a trough-like shape (as shown in FIG. 5B). Design considerations will set the number of segments. That is, space and coating requirements. It would be best for the system to have a single segment, but some operations may not have the room; hence, the system may be split into two or more segments. In fact, the first commercial system will employ a dual segment, dual screw mixer as shown in FIG. 8.

Figure 3C:
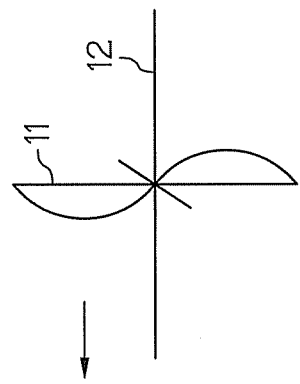
FIGS. 3A and 3C show a single paddle support rod in the mixer. It should be noted, for clarity, that only one of the plurality of paddles is shown. The arrow indicates the direction of mix flow that is imparted by the turning mixer paddles.
Figure 3D:
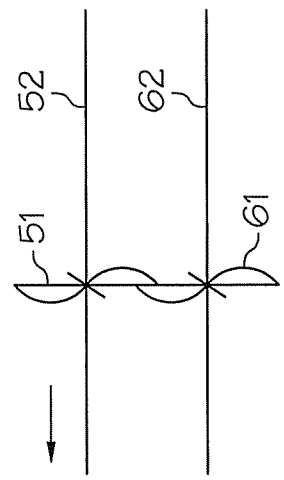
FIG. 3B and 3D show a dual paddle support rod. Again for clarity, only one of the plurality of paddles per support rod is shown. The arrow indicates the direction of mix flow that is imparted by the turning mixer paddles.
Figure 3A:
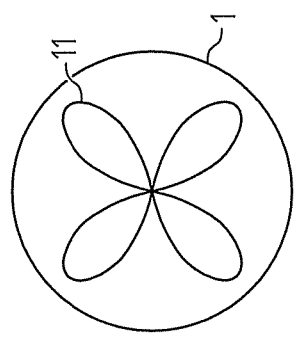

FIGS. 3A and 3C give details on the paddle arrangement in a single screw continuous mixer. The paddles, 11, are mounted to a screw shaft, 12, at a pitch that will insure movement of the sand-mix through the continuous mixer as the screw shaft is rotated. There is nothing critical about the pitch, and it may be chosen by trial and error to lie somewhere between 3 degrees to 60 degrees to drive the material forward (If the pitch is too sharp the sand will be mixed and not transported, and, if the pitch is too flat the same result will be obtained. A person skilled in the art of material transport will have little difficulty in choosing the correct pitch). However, as explained, the pitch may be set to drive the mix backward therefore the pitch can range from 0-360 degrees depending on the function of the particular paddle.

Figure 3B:
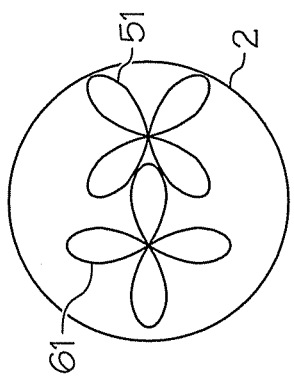

FIG. 3B shows an alternate arrangement for the rapid action coater. FIG. 3B shows a twin screw arrangement. Here two screw shafts, 50 and 60, are employed with a plurality of paddles, 51 and 61, attached to their respective shaft. The paddles are carefully set to pass between each other (mechanical clearance) and employ an angle to ensure movement of the sand-mix through the mixer. FIG. 3B actually shows the preferred embodiment. The two screws are designed to turn in opposite directions thereby moving the mix more efficiently. This is still a design choice.

FIG. 4 provides further detail for a triple screw system, 70, 80 and 90 using a two segment variation, 4. Each mixer system has an associated mixer screw shaft, 72, 82 and 92 along with associated paddles, 71, 81 and 91. FIG. 4 also shows how the mixer motors and blades interact with each other and where the various materials are added in the top mixer. The three bladed mixer/motor combinations may be used in the embodiments of FIGS. 2, 5A and 5B.

The cross-section of the continuous mixer is shown in FIGS. 3A, 3B and 6 and in FIGS. 8A, 8B, 8C and 8D as a circle. This is the preferred shape for the prototype and first commercial units. However, it is anticipated that other cross-sections may be more efficient. For example, FIG. 4 shows a very convoluted side view that follows the outline of the mixer paddles. The preferred dual screw mixer could set the overall required cross-section of the continuous mixer.

FIG. 6 shows a further embodiment of the continuous mixer which utilizes split housing (in general 99) with two halves, 96 and 95. It was noted during experimental runs that problems would occur inside the unit and a split unit was much easier to maintain. The split unit may be hinged (94) on one side and bolted to lips, 98 and 97 on the other side or may be bolted on both sides. The actual design would hinge on size—a large unit would be difficult to hinge. In the commercial design, a hydraulically operated clam shell design is employed. This is just an engineering design decision.

As explained earlier, the pitch on the paddles is adjustable. Thus, the paddles may be set to drive the mix forward or backward in combination. The notion being that the mix will travel down the mixer to a point (or points) where the reverse paddle(s) resides, then the mix will reverse, hit additional mix coming forward, change direction, etc. This will ensure further mixing and residence times.

Figure 7:
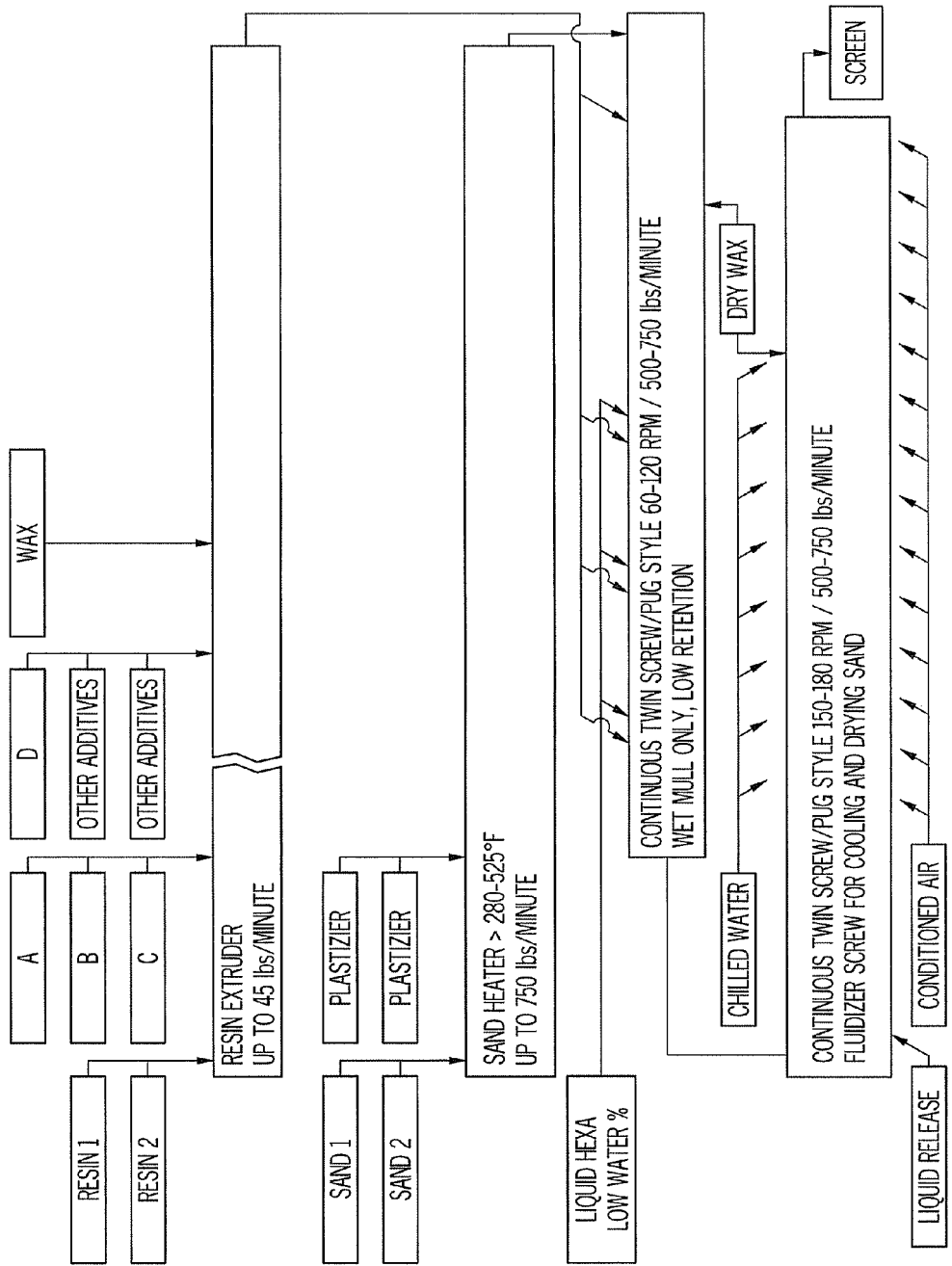
FIG. 7 shows a temperature and flow chart for the prototype system.
Figure 8D:
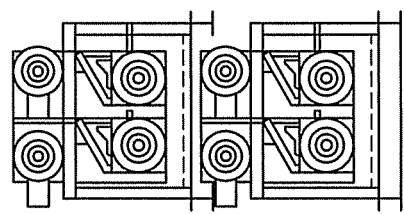
FIGS. 8A, 8B, 8C and 8D show a preliminary engineering design for a variation of the rapid action continuous mixer.
Figure 8A:
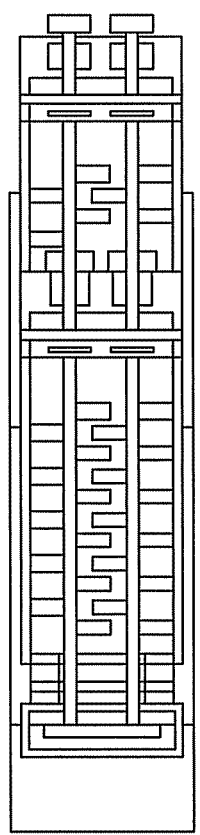
Figure 8B:
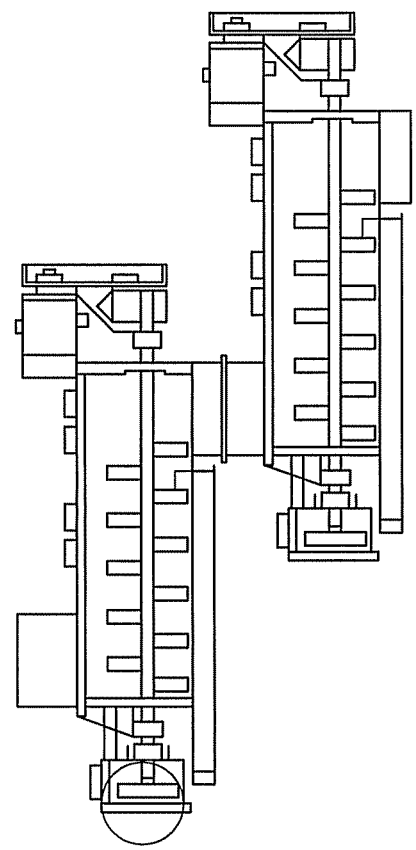
Figure 8C:
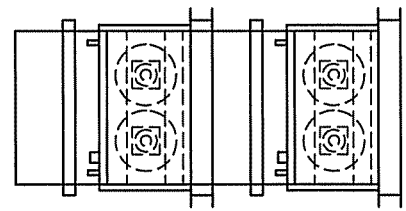

FIG. 7 shows a flow chart giving temperatures, injection ports, materials and the like for the prototype unit along with expected temperatures. The chart shows chilled water option which can be used if high melting temperature resins are employed and a more rapid quench of the chemical reaction is required. In the prototype system the residence times in the mixer varied between 40 and 60 seconds. Again this time is set by the requirements of the coating and could be as low as several seconds to as high as several minutes.

FIGS. 8A, 8B, 8C and 8D show a preliminary engineering design for a unit employing the continuous rapid action coater based on the prototype. The dual screw, dual segment, prototype had a segment length of 32-inches [82 cm], operated at 36 rpm, had a residence time of 59 seconds and coated 20 pounds/minutes [9 kg/minute] of product. The prototype has been scaled up to 1667 pounds per minutes [758 kg/minute].

Figure 9:
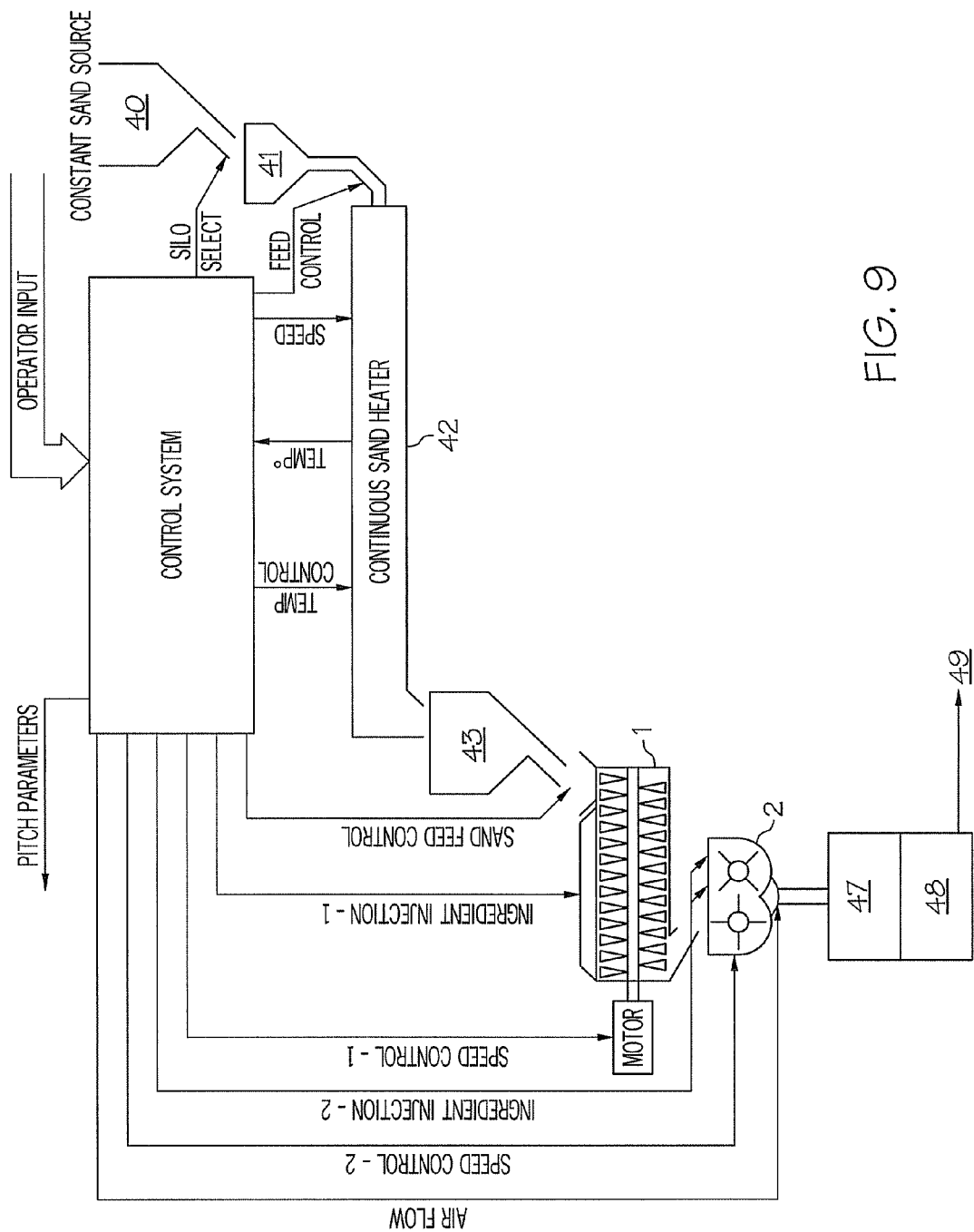
FIG. 9 shows a control logic chart for the commercial system.

The commercial unit employs state of the art computer control which controls the temperature and feed-rate of sand and the feed-rate of ingredients to the mixer. A logic chart is shown in FIG. 9. Thus, the operator selects the type of product that is to be produced and the control system will then set all parameters, based on retained formulae, to make the particular product. The only possible manual action would be any change of pitch of the screw feeder paddles if a hydraulic pitch control is not used. (The control system would inform the operator of the required manual changes—if any.) Finally the control system will control drying/cooling air injection and the speed of the mixer screws as part of the product manufacture. (Manual selection of the required sand silo may be necessary.)

Although it is unlikely, there may be situations in which the coating process requires intermittent transportation of the particles. That is, apply coat materials to the particles, hold the particles in position for a period of time, move the particles, apply coating materials, etc. This would be equivalent to a batch operation in a continuous apparatus. This can be accomplished in the instant device by stopping the mixing/transportation augers and controlling the feed and ingredients to the device. Thus, the apparatus can operate in batch mode if necessary.

A person having ordinary skill in the art of material transfer and resin coating of particles can readily understand this disclosure and make the necessary calculations of residence time, paddle pitch, screw speed, dimensions and etc. Thus, it is believed that there has been fully disclosed a rapid action coater for adding a resin coat to materials (and, substrates and the like). The unit may be used to coat substrate with polymers.

As described above sequences, times and temperatures may vary and such variations are considered to be within the scope of this disclosure. The instant device will significantly lower capital equipment costs, will increase productivity, provide a more consistent product (when compared to current art batch processes) and reduce energy costs. The instant device will also allow for quicker change in product as the device is more or less self cleaning.

We claim:

1. A continuous process for producing resin coated ceramic particles comprising
    feeding ceramic particles heated to a temperature above the melting point of the resin into an inlet of a mixing zone and withdrawing resin coated particles from an outlet of the mixing zone in a manner such that the particles travel along a travel path essentially continuously from the inlet to the outlet,
    combining a resin with the ceramic particles in the mixing zone at a first location along the travel path,
    mixing the resin and particles in the mixing zone, thereby causing the resin to melt and encapsulate the individual particles as they move along the travel path,
    combining a curing agent for the resin with the ceramic particles and the resin in the mixing zone at a second location along the travel path downstream of the first location, and
    cooling the resin encapsulated particles to a temperature below the melting point of the resin, thereby producing an essentially free flowing mass of resin coated particles at the outlet of the mixing zone,
    wherein the mixture of resin and particles is moved through the mixing zone by at least one auger comprising a rotating shaft and multiple paddles connected thereto, some of the paddles being arranged with reverse pitch to cause backward travel of the mixture in a portion of the mixing zone, thereby increasing the residence time of the mixture in the mixing zone.

2. The process of claim 1, wherein the at least one auger is essentially horizontal.

3. The process of claim 2, wherein the mixture of resin and particles is moved through at least a portion of the mixing zone by at least two augers, each auger comprising a rotating shaft and multiple paddles connected thereto, the augers being arranged generally adjacent to one another in a manner so that, as the augers rotate, the paddles of adjacent augers mechanically clear one another yet overlap one another when viewed in the axial direction of the augers.

4. The process of claim 3, wherein the mixing zone is divided into at least three mixing zone segments, wherein in each mixing zone segment resin and then curing agent are separately added to the particles in that mixing zone segment to produce a resin coating on the particles, and wherein the at least three mixing zone segments are arranged in series with respect to one another so that the resin coating produced in each successive mixing zone segment is applied to the coating produced in the preceding mixing zone segment.

5. The process of claim 4, wherein the resin is in solid particulate form when fed to the mixing zone, and further wherein the resin encapsulated particles are cooled below the melting point of the resin by contact with a liquid before being withdrawn from the mixing zone.

6. The process of claim 5, wherein the resin is a phenolic resin and the curing agent is hexamethylenetetramine.

7. The process of claim 6, wherein the resin encapsulated particles are cooled to a temperature below the curing temperature of the resin so that the resin coating on the ceramic particles is a B-stage phenolic resin.

8. The process of claim 7, wherein a resin coated proppant is produced.

9. The process of claim 7, wherein a resin coated foundry sand is produced.

10. The process of claim 1, wherein the mixing zone is divided into at least three mixing zone segments, wherein in each mixing zone segment resin and then curing agent are separately added to the particles in that mixing zone segment to produce a resin coating on the particles, and wherein the at least three mixing zone segments are arranged in series with respect to one another so that the resin coating produced in each successive mixing zone segment is applied to the coating produced in the preceding mixing zone segment.

11. The process of claim 10, wherein the resin is in solid particulate form when fed to the mixing zone, and further wherein the resin encapsulated particles are cooled below the melting point of the resin by contact with a liquid before being withdrawn from the mixing zone.

12. The process of claim 11, wherein the resin is a phenolic resin and the curing agent is hexamethylenetetramine.

13. The process of claim 12, wherein the resin encapsulated particles are cooled to a temperature below the curing temperature of the resin so that the resin coating on the ceramic particles is a B-stage phenolic resin.

14. The process of claim 13, wherein a resin coated proppant is produced.

15. The process of claim 13, wherein a resin coated foundry sand is produced.

16. The process of claim 10, wherein the mixture of resin and particles is moved through at least a portion of the mixing zone by at least two augers, each auger comprising a rotating shaft and multiple paddles connected thereto, the augers being arranged generally adjacent to one another in a manner so that, as the augers rotate, the paddles of adjacent augers mechanically clear one another yet overlap one another when viewed in the axial direction of the augers.

17. The process of claim 1, wherein mixing of the resin and particles causes a mixture of resin and particles to form in the mixing zone, wherein the pitch of the paddles is arranged to move this mixture forward through the mixing zone, and further wherein some of the paddles are arranged with a reverse pitch for driving the mixture backwards in the mixing zone, thereby increasing the residence time of the mixture inside the mixing zone.

18. The process of claim 17, wherein the paddles are arranged so that the mixture travels forward and backward in combination.

19. The process of claim 17, wherein the paddles are arranged so that the mixture travels forward down the travel path inside the mixing zone to the location of the paddles arranged with reverse pitch where the mixture reverses direction and hits additional mixture traveling forward in the mixing zone, thereby increasing the residence time of the mixture inside the mixing zone.

* * * * *